United States Patent
Falahati et al.

(10) Patent No.: US 11,184,926 B2
(45) Date of Patent: Nov. 23, 2021

(54) LBT PARAMETERS FOR SRS TRANSMISSION

(71) Applicant: Telefonaktiebolaget LM Ericsson (publ), Stockholm (SE)

(72) Inventors: Sorour Falahati, Stockholm (SE); Havish Koorapaty, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/324,654

(22) PCT Filed: Aug. 11, 2017

(86) PCT No.: PCT/IB2017/054921
§ 371 (c)(1),
(2) Date: Feb. 11, 2019

(87) PCT Pub. No.: WO2018/029654
PCT Pub. Date: Feb. 15, 2018

(65) Prior Publication Data
US 2019/0215866 A1   Jul. 11, 2019

Related U.S. Application Data

(60) Provisional application No. 62/374,462, filed on Aug. 12, 2016.

(51) Int. Cl.
*H04W 74/08* (2009.01)
*H04L 5/00* (2006.01)
(Continued)

(52) U.S. Cl.
CPC ....... *H04W 74/0816* (2013.01); *H04L 5/0055* (2013.01); *H04W 16/14* (2013.01); *H04W 72/0446* (2013.01); *H04W 72/10* (2013.01)

(58) Field of Classification Search
CPC ............ H04W 74/0816; H04W 16/14; H04W 72/0446; H04W 72/10; H04L 5/0055
See application file for complete search history.

(56) References Cited

U.S. PATENT DOCUMENTS 10,721,766 B2 * 7/2020 Kim .................. H04W 72/0493
2016/0345326 A1 * 11/2016 Yerramalli ............ H04L 1/1657

OTHER PUBLICATIONS

Nokia et al., "Channel Access for LAA UL—Final, 3rd Generation Partnership Project (3GPP)," May 13, 2016, http://www.3gpp.org/ftp/Meetings_3GPP_SYNC/RAN1/Docs/ (Year: 2016).*

(Continued)

*Primary Examiner* — Walter J DiVito
(74) *Attorney, Agent, or Firm* — Baker Botts, LLP

(57) ABSTRACT

According to some embodiments, a method for use in a user equipment (UE) of managing a listen-before-talk (LBT) contention window size comprises performing a first LBT procedure using a first contention window size and priority class for a first uplink transmission in unlicensed spectrum. The first uplink transmission comprises an acknowledged transmission. The method further comprises transmitting a second uplink transmission. The second uplink transmission comprises an un-acknowledged transmission. The method further comprises receiving an acknowledgement for the first uplink transmission, and modifying both the first contention window size and a second contention window based on the received acknowledgement. The method further comprises performing a second LBT procedure using the second contention window size and a second priority class for a third uplink transmission in unlicensed spectrum. The third uplink transmission comprises an un-acknowledged transmission.

18 Claims, 9 Drawing Sheets

(51) Int. Cl.
    *H04W 16/14*     (2009.01)
    *H04W 72/04*     (2009.01)
    *H04W 72/10*     (2009.01)

(56) References Cited

OTHER PUBLICATIONS

PCT International Search Report for International application No. PCT/IB2017/054921—dated Nov. 16, 2017.
PCT Written Opinion of the International Searching Authority for International application No. PCT/IB2017/054921—dated Nov. 16, 2017.
3GPP TSG RAN WG1 Meeting #85; Nanjing, China; Title: Channel Access for LAA UL; Source: Nokia, Alcatel-Lucent Shanghai Bell (R1-164990)—May 23-27, 2016.
3GPP TSG RAN WG1 Meeting #84; St. Julian's, Malta; Title: Channel Access for the Support of LAA UL; Source: Nokia Networks, Alcatel-Lucent, Alcatel-Lucent Shanghai Bell (R1-160914)—Feb. 15-19, 2016.
3GPP TSG RAN WG1 Meeting #84; St. Julian's, Malta; Source: Huawei, HiSilicon; Title: Analysis on LBT with Category 2 and 4 for eLAA (R1-160297)—Feb. 15-19, 2016.

* cited by examiner

LBT PARAMETERS FOR SRS TRANSMISSION

PRIORITY

This nonprovisional application is a U.S. National Stage Filing under 35 U.S.C. § 371 of International Patent Application Serial No. PCT/IB2017/054921 filed Aug. 11, 2017 and entitled "LBT Parameters for SRS Transmission" which claims priority to U.S. Provisional Patent Application No. 62/374,462 filed Aug. 12, 2016 both of which are hereby incorporated by reference in their entirety.

TECHNICAL FIELD

Particular embodiments are directed to wireless communications and, more particularly, to methods and apparatus for signaling and management of listen-before-talk (LBT) parameters for sounding reference signal (SRS) transmission in unlicensed spectrum.

INTRODUCTION

The Third Generation Partnership Project (3GPP) initiative referred to as License Assisted Access (LAA) enables long term evolution (LTE) equipment to operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

The standalone LTE-U forum and 3GPP Rel-14 work item on Uplink Licensed-Assisted Access (LAA) may specify that LTE user equipment (UEs) may transmit on the uplink in the unlicensed 5 GHz or license-shared 3.5 GHz radio spectrum. For the case of standalone LTE-U, all downlink and uplink transmissions take place entirely on the unlicensed spectrum.

Regulatory requirements may not permit transmissions in the unlicensed spectrum without prior channel sensing. This is because the unlicensed spectrum is shared with radios of similar or dissimilar wireless technologies. Wireless devices may perform channel sensing using a listen-before-talk (LBT) method. The LBT method includes sensing the transmission medium for a pre-defined minimum amount of time and backing off if the channel is busy. Therefore, a goal of the initial random access (RA) procedure for standalone LTE-U is to minimize the number of transmissions and to minimize latency, so that the number of LBT operations can be minimized and the RA procedure can then be completed as quickly as possible.

Currently the unlicensed 5 GHz spectrum is mainly used by IEEE 802.11 Wireless Local Area Network (WLAN) equipment, also referred to by their marketing brand as "Wi-Fi." Wi-Fi, LAA and Standalone LTE-U may operate in multi-carrier mode with simultaneous transmission across multiple unlicensed channels in the 5 GHz band. Wi-Fi follows a hierarchical multi-carrier LBT scheme across multiple carriers which are selected using specific channel bonding rules.

For LAA and Standalone LTE-U, uplink transmissions are explicitly scheduled by the eNB, which has full control over when UEs are allowed to transmit. For carriers operating in unlicensed spectrum, however, UEs perform a form of LBT before transmitting on the carrier. The form of LBT may depend on the number of UEs that are scheduled, the number of subframes that are scheduled in succession, the length of the previous transmissions on the carrier, and/or other such factors. Some parameters related to LBT may be signaled by the eNB to UEs so that the UEs may perform LBT before transmission.

As background, LTE uses OFDM in the downlink and discrete Fourier transform (DFT)-spread OFDM (also referred to as single-carrier FDMA) in the uplink. The basic LTE downlink physical resource comprises a time-frequency grid as illustrated in FIG. 1.

FIG. 1 illustrates an example OFDM symbol. The horizontal axis represents time and the other axis represents frequency. Each resource element corresponds to one OFDM subcarrier during one OFDM symbol interval. An uplink subframe has the same subcarrier spacing as the downlink and the same number of SC-FDMA symbols in the time domain as OFDM symbols in the downlink. In the time domain, LTE downlink transmissions are organized into radio frames.

FIG. 2 illustrates an example radio frame. Each radio frame is 10 ms and consists of ten equally-sized subframes of length Tsubframe=1 ms. For normal cyclic prefix, one subframe consists of 14 OFDM symbols. The duration of each symbol is approximately 71.4 µs.

Resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

In LTE, uplink transmissions are dynamically scheduled (i.e., in each downlink subframe the base station transmits control information about which terminals should transmit data to the eNB in subsequent subframes, and upon which resource blocks the data is transmitted). The uplink resource grid comprises data and uplink control information in the physical uplink shared channel (PUSCH), uplink control information in the physical uplink control channel (PUCCH), and various reference signals such as demodulation reference signals (DMRS) and sounding reference signals (SRS).

Uplink DMRS and SRS are time-multiplexed into the uplink subframe, and SRS are always transmitted in the last symbol of a normal uplink subframe. DMRS are used for coherent demodulation of PUSCH and PUCCH data. The PUSCH DMRS is transmitted once every slot for subframes with normal cyclic prefix, and is located in the fourth and eleventh SC-FDMA symbols.

SRS is not associated with any data or control information but is generally used to estimate the uplink channel quality for purposes of frequency-selective scheduling. SRS from different UEs with different sounding bandwidths can overlap. Interleaved FDMA is used for SRS with a repetition factor of 2, which means that in the configured SRS bandwidth, the SRS will be mapped to every other subcarrier in a comb-like fashion.

Another wireless network technology that may share unlicensed spectrum with LTE is a wireless local area network (WLAN). Typical WLAN deployments use carrier sense multiple access with collision avoidance (CSMA/CA) for medium access. This means that the channel is sensed to perform a clear channel assessment (CCA), and a transmission is initiated only if the channel is determined to be idle. If the channel is determined to be busy, then the transmission is deferred until the channel is idle. When the range of several access points using the same frequency overlap, all transmissions related to one access point might be deferred when a transmission on the same frequency to or from another access point which is within range is detected. Effectively, if several access points are within range of each other, they will need to share the channel in time, and the throughput for the individual access points may be severely degraded. A general illustration of the listen-before-talk (LBT) mechanism on a single unlicensed channel is shown in FIG. 3.

FIG. 3 illustrates an example WLAN listen-before-talk mechanism. In the case of single-channel LBT, after a first Wi-Fi station transmits a data frame to a second Wi-Fi station, the second station transmits an ACK frame back to the first station with a delay of 16 μs. The ACK frame is transmitted by the second station without performing an LBT operation. To prevent another station interfering with the ACK frame transmission, a station defers for a duration of 34 μs (referred to as DIFS) after the channel is observed to be occupied before assessing again whether the channel is occupied.

Thus, a station that wishes to transmit first performs a clear channel assessment by sensing the medium for a fixed duration DIFS. If the medium is idle, then the station assumes that it may take ownership of the medium and begins a frame exchange sequence. If the medium is busy, the station waits for the medium to go idle, defers for DIFS, and waits for a further random backoff period. To further prevent a station from occupying the channel continuously and thereby preventing other stations from accessing the channel, after a successful transmission, a station performs a random backoff before transmitting again.

For multi-carrier operation, Wi-Fi uses a hierarchical channel bonding scheme to determine its transmission bandwidth for a frame, which could be 20 MHz, 40 MHz, 80 MHz, or 160 MHz, for example. In the 5 GHz band, wider Wi-Fi channel widths of 40 MHz, 80 MHz, 160 MHz or 80+80 MHz are formed by combining 20 MHz sub-channels in a non-overlapping manner. A pre-determined primary channel performs the contention window-based random access procedure after a defer period, if necessary, and then counts down the random number generated. The secondary channels perform a quick CCA check for a PIFS duration (generally 25 μs) before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is always included in all transmissions (i.e., transmission on secondary channels alone is not allowed).

LTE has traditionally used dedicated frequency spectrum. An advantage of dedicated spectrum is that an LTE system does not need to coexist with other non-3GPP radio access technologies in the same spectrum, which can maximize spectrum efficiency. The spectrum allocated to LTE, however, is limited. It may not meet the ever increasing demand for larger throughput from applications/services. Therefore, 3GPP also specifies how LTE may use unlicensed spectrum in addition to licensed spectrum. In addition, Standalone LTE-U is under development by the MulteFire Alliance, in which LTE operates solely in unlicensed spectrum.

FIG. 4 illustrates a user equipment with license assisted access to unlicensed spectrum. In license assisted access, a UE is connected to a PCell in the licensed band and one or more SCells in the unlicensed band. A secondary cell in unlicensed spectrum may be referred to as a LAA secondary cell (LAA SCell). The LAA SCell may operate in downlink-only mode or operate with both uplink and downlink traffic. In some scenarios, LTE nodes may operate in standalone mode in license-exempt channels without assistance from a licensed cell.

Unlicensed spectrum can, by definition, be used simultaneously by multiple different technologies. Therefore, LAA must coexist and cooperate with other systems, such as IEEE 802.11 (Wi-Fi). To coexist fairly with a Wi-Fi system, transmission on the SCell conforms to LBT protocols to avoid collisions which may cause severe interference to on-going transmissions. This includes both performing LBT before commencing transmissions, and limiting the maximum duration of a single transmission burst. The maximum transmission burst duration is specified by country and region-specific regulations (e.g., 4 ms in Japan and 13 ms according to EN 301.893). An example is illustrated in FIG. 5.

FIG. 5 illustrates an example of uplink license assisted access transmissions based on an uplink listen-before-talk protocol. The example illustrates a duration of a transmission burst on an LAA SCell constrained by a maximum allowed transmission duration of 4 ms. For example, the illustration divides an 8 ms occupancy time into 4 ms for downlink channel occupancy and 4 ms for uplink channel occupancy.

Before the eNB transmits data in the downlink, it performs LBT to gain channel access. During the eNB's transmission duration, it also sends out control channels to schedule certain UEs to transmit in the uplink at a specific time later. After the eNB releases the channel, the scheduled UEs perform LBT to determine whether they can transmit in the channel at said specific time. For example, after receiving a downlink transmission in subframes n−4 to n−1 (i.e., 4 ms), the UE performs a clear channel access for the uplink at subframe n. If the channel is clear, the UE transmits in uplink for subframes n to n+3 (i.e., 4 ms).

When an eNB obtains an opportunity to transmit in unlicensed spectrum, the opportunity (also referred to as a transmit opportunity (TXOP)), may be shared with UEs that the eNB is serving. Transitions between transmissions from the eNB to transmissions from UEs may be handled in two ways, one where the UEs perform an LBT operation prior to transmission and one where the UEs do not perform an LBT operation.

The case where an LBT operation is not performed will most likely need the gap between downlink transmissions (from the eNB) and uplink transmissions (from the UE(s)) to be no more than 16 μs. When an LBT operation is to be performed for a particular subframe, gaps will need to be inserted in the uplink subframes to allow for the UE to perform a listen-before-talk operation without being interfered by transmissions from other UEs in the same serving cell. To avoid significantly degrading uplink throughput, the gaps should not be too large. Therefore, the gap in an uplink subframe of 14 DFT spread OFDM (DFTS-OFDM) symbols is likely to not be larger than one DFTS-OFDM symbol, which is approximately 71 microseconds in duration.

Performing LBT may generally include two broad categories of LBT operation. A first type uses an LBT procedure with full random backoff similar to what is used by IEEE 802.11 compliant nodes. These schemes are also referred to as Category 4 LBT schemes.

In these schemes a random backoff counter is drawn uniformly randomly in the interval {0, CW}, where CW is the contention window. The size of the contention window may be approximately doubled every time a collision on the channel is detected. Thus, this procedure may also be referred to as a binary exponential backoff.

The contention window size is limited by a minimum value, CWmin, and a maximum value, CWmax. The values of CWmin and CWmax may vary depending on the priority class of the traffic. For the highest priority class, the {CWmin, CWmax} values may be limited to {3, 7} where these numbers are counted in increments of one slot which has a duration of 9 microseconds as shown in FIG. 3. There are four defined priority classes. The remaining three priority classes use contention window size pairs of {7, 15}, {15, 63} and {15, 1023}, respectively, for an access point (AP) or an eNB. For Wi-Fi STAs or UEs in LTE, the values of {15, 63} are not used.

In the second type of LBT procedure, a UE may perform an LBT operation for a fixed duration (e.g., 25 μs). Generally, the second type of LBT is preferable for transitions between downlink and uplink transmissions, because it minimizes the probability of another node completing its LBT operations and commencing transmissions on the channel. Many situations, however, may need to use a Category 4 LBT scheme.

One technique to minimize gaps between downlink and uplink transmissions is to use a timing advance command to advance the timing of the UEs transmissions on the uplink so that they occur earlier. This technique may be used where the eNB may employ transmissions only over a part of the subframe in the last downlink subframe of a transmission burst. In this case, there is a gap within the downlink subframe that can be occupied by uplink transmissions by UEs that have received timing advance (TA) commands.

For transmissions that are subject to LBT performing a random backoff or a Category 4 LBT procedure, the contention window size (CWS) determines the range that the random backoff counter is initialized to for performing LBT. If feedback (e.g., acknowledgements) for such a transmission is provided, then the corresponding contention window size can be adjusted to handle the collision such that larger contention window is used when a collision is experienced and smaller otherwise.

Transmissions subject to Category 4 LBT may also include non-acknowledged transmissions. In such cases the contention window size remains unchanged. However, from an overall system performance and coexistence perspective, some situations may benefit from adjustment of the contention window size despite the lack of feedback for such transmissions. A particular example is transmission of the SRS signal in the unlicensed spectrum based on Category 4 LBT where immediate feedback is not available.

SUMMARY

The embodiments described herein include adjusting the contention window size for transmissions of non-acknowledged signals. SRS transmission by the UE is used as one example, but particular embodiments may include any non-acknowledged signal.

In general, the contention window size used for a Category 4 LBT operation of a non-acknowledged transmissions is updated similarly to the contention window size of an acknowledged transmission received from the same node.

According to some embodiments, a method for use in a user equipment (UE) of managing a listen-before-talk (LBT) contention window size comprises performing a first LBT procedure using a first contention window size and a first priority class for a first uplink transmission in unlicensed spectrum. The first uplink transmission comprises an acknowledged transmission. The method further comprises transmitting a second uplink transmission in unlicensed spectrum. The second uplink transmission comprises an un-acknowledged transmission. The method further comprises receiving an acknowledgement for the first uplink transmission; modifying the first contention window size based on the received acknowledgement for the first uplink transmission and the first priority class; modifying a second contention window size based on the received acknowledgement for the first uplink transmission and the second priority class; and performing a second LBT procedure using the second contention window size and the second priority class for a third uplink transmission in unlicensed spectrum. The third uplink transmission comprises an un-acknowledged transmission.

In particular embodiments, modifying the second contention window size comprises incrementing the second contention window size according to the second priority class when the acknowledgement for the first uplink transmission is a negative acknowledgement and resetting the second contention window size according to the second priority class when the acknowledgement for the first uplink transmission is a positive acknowledgement. The first uplink transmission may comprise a most recent acknowledged uplink transmission transmitted after the first LBT procedure. The second uplink transmission may be transmitted within a predetermined time threshold of the first uplink transmission. The predetermined time threshold may be modified based on network conditions.

In particular embodiments, modifying the second contention window size comprises setting the second contention window size equal to the modified first contention window size. The first priority class may be equal to the second priority class.

In particular embodiments, the first uplink transmission comprises a physical uplink shared channel (PUSCH) transmission, and the second and third uplink transmissions comprise a sounding reference signal (SRS) transmission.

According to some embodiments, a UE capable of managing a LBT contention window size comprises processing circuitry operable to perform a first LBT procedure using a first contention window size and a first priority class for a first uplink transmission in unlicensed spectrum. The first uplink transmission comprises an acknowledged transmission. The processing circuitry is further operable to transmit a second uplink transmission in unlicensed spectrum. The second uplink transmission comprises an un-acknowledged transmission. The processing circuitry is further operable to receive an acknowledgement for the first uplink transmission; modify the first contention window size based on the received acknowledgement for the first uplink transmission and the first priority class; modify a second contention window size based on the received acknowledgement for the first uplink transmission and the second priority class; and perform a second LBT procedure using the second contention window size and the second priority class for a third uplink transmission in unlicensed spectrum. The third uplink transmission comprises an un-acknowledged transmission.

In particular embodiments, the processing circuitry modifies the second contention window size by incrementing the second contention window size according to the second priority class when the acknowledgement for the first uplink transmission is a negative acknowledgement and resetting the second contention window size according to the second priority class when the acknowledgement for the first uplink transmission is a positive acknowledgement. The first uplink transmission may comprise a most recent acknowledged uplink transmission transmitted after the first LBT procedure. The second uplink transmission may be transmitted within a predetermined time threshold of the first uplink transmission. The predetermined time threshold may be modified based on network conditions.

In particular embodiments, the second contention window size may be set equal to the modified first contention window size. The first priority class may be equal to the second priority class.

In particular embodiments, the first uplink transmission comprises a PUSCH transmission, and the second and third uplink transmissions comprise a SRS transmission.

According to some embodiments, a UE capable of managing a LBT contention window size comprises a receiving module, a determining module, an LBT module, and a transmitting module. The LBT module is operable to perform a first LBT procedure using a first contention window size and a first priority class for a first uplink transmission in unlicensed spectrum. The first uplink transmission comprises an acknowledged transmission. The transmitting module is operable to transmit a second uplink transmission in unlicensed spectrum. The second uplink transmission comprises an un-acknowledged transmission. The receiving module is operable to receive an acknowledgement for the first uplink transmission. The determining module is operable to modify the first contention window size based on the received acknowledgement for the first uplink transmission and the first priority class; and modify a second contention window size based on the received acknowledgement for the first uplink transmission and the second priority class. The LBT module is further operable to perform a second LBT procedure using the second contention window size and the second priority class for a third uplink transmission in unlicensed spectrum. The third uplink transmission comprises an un-acknowledged transmission.

Also disclosed is a computer program product. The computer program product comprises instructions stored on non-transient computer-readable media which, when executed by a processor, perform a first LBT procedure using a first contention window size and a first priority class for a first uplink transmission in unlicensed spectrum. The first uplink transmission comprises an acknowledged transmission. The instructions further perform the act of transmitting a second uplink transmission in unlicensed spectrum. The second uplink transmission comprises an un-acknowledged transmission. The instructions further perform the acts of receiving an acknowledgement for the first uplink transmission; modifying the first contention window size based on the received acknowledgement for the first uplink transmission and the first priority class; modifying a second contention window size based on the received acknowledgement for the first uplink transmission and the second priority class; and performing a second LBT procedure using the second contention window size and the second priority class for a third uplink transmission in unlicensed spectrum. The third uplink transmission comprises an un-acknowledged transmission.

Particular embodiments may exhibit some of the following technical advantages. For example, particular embodiments may improve uplink and/or system performance by reducing the number of collisions. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
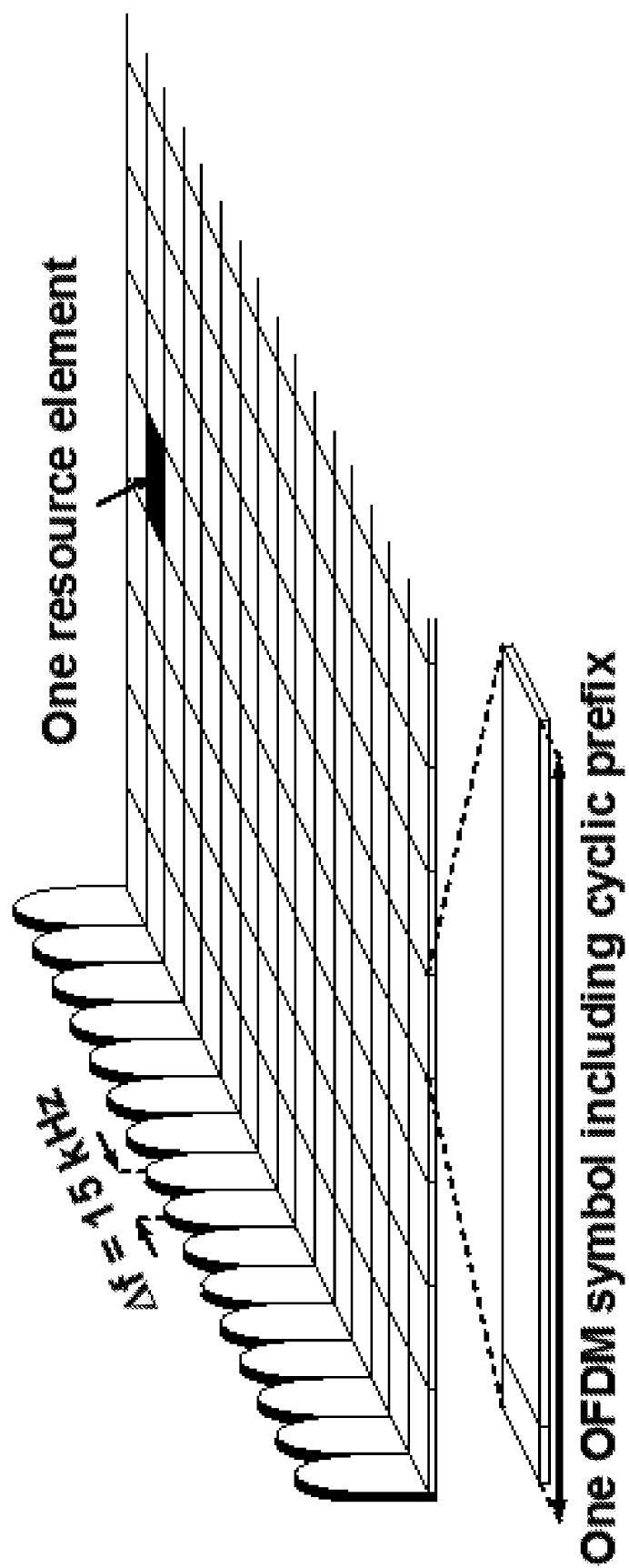
FIG. 1 illustrates an example OFDM symbol.

Long term evolution (LTE) equipment may operate in the unlicensed 5 GHz radio spectrum according to the Third Generation Partnership Project (3GPP) initiative referred to as License Assisted Access (LAA). The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell).

Regulatory requirements may not permit transmissions in the unlicensed spectrum without prior channel sensing. Wireless devices may perform channel sensing using a listen-before-talk (LBT) method. The LBT method includes sensing the transmission medium for a pre-defined minimum amount of time and backing off if the channel is busy.

Before an eNB transmits data in the downlink, it performs LBT to gain channel access. During the eNB's transmission duration, it also sends out control channels to schedule certain UEs to transmit in the uplink at specific time later. After the eNB releases the channel, the scheduled UEs perform LBT to determine whether they can transmit in the channel at said specific time.

When an eNB obtains an opportunity to transmit in unlicensed spectrum, the transmit opportunity may be shared with UEs that the eNB is serving. Transitions between transmissions from the eNB to transmissions from UEs may be handled in two ways, one where the UEs perform an LBT operation prior to transmission and one where the UEs do not perform an LBT operation.

Performing LBT may generally include two broad categories of LBT operation. A first type uses an LBT procedure with full random backoff similar to what is used by IEEE 802.11 compliant nodes. These schemes are also referred to as Category 4 LBT schemes.

In these schemes a random backoff counter is drawn uniformly randomly in the interval $\{0, CW\}$, where CW is the contention window. The size of the contention window may be approximately doubled every time a collision on the channel is detected. Thus, this procedure may also be referred to as a binary exponential backoff.

The contention window size is limited by a minimum value, CWmin, and a maximum value, CWmax. The values of CWmin and CWmax may vary depending on the priority class of the traffic.

In the second type of LBT procedure, a UE may perform an LBT operation for a fixed duration (e.g., 25 µs). Generally, the second type of LBT is preferable for transitions between downlink and uplink transmissions, because it minimizes the probability of another node completing its LBT operations and commencing transmissions on the channel. Many situations, however, may need to use a Category 4 LBT scheme.

3GPP specifications may include multi-subframe scheduling for Rel-14 LAA where one or more uplink grants transmitted in a single subframe can schedule uplink data in multiple subframes. The parameters that are signaled as part of the multi-subframe scheduling grant include hybrid ARQ acknowledgements (HARQ-ACKs) and related parameters. Specifically, the grants may include parameters such as the new data indication (NDI), redundancy version (RV), and the HARQ-ACK bits.

For transmissions that are subject to LBT performing a random backoff or a Category 4 LBT procedure, the contention window size (CWS) determines the range that the random backoff counter is initialized to for performing LBT. If feedback (e.g., HARQ acknowledgements) for such a transmission is provided, then the corresponding contention window size can be adjusted to handle the collision such that larger contention window is used when a collision is experienced and smaller otherwise.

Transmissions subject to Category 4 LBT may also include non-acknowledged transmissions. In such cases the contention window size remains unchanged. However, from an overall system performance and coexistence perspective, some situations may benefit from adjustment of the contention window size despite the lack of feedback for such transmissions. A particular example is transmission of the SRS signal in the unlicensed spectrum based on Category 4 LBT where immediate feedback is not available.

Particular embodiments obviate the problems described above and include adjusting the contention window size for transmissions of non-acknowledged signals. In general, the contention window size used for a Category 4 LBT operation of a non-acknowledged transmission is updated similarly to the contention window size of an acknowledged transmission received from the same node. Adjusting the contention window size for unacknowledged transmissions may improve uplink and/or system performance by reducing the number of collisions. SRS transmission by the UE is used as one example, but particular embodiments may include any non-acknowledged signal.

The embodiments described herein are applicable to both LAA LTE and standalone LTE-U operation, and in general for any system such as LTE operating in unlicensed spectrum or any spectrum where listen-before-talk protocols are used and where there is some fixed timing where transmissions occur.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 6-9 of the drawings, like numerals being used for like and corresponding parts of the various drawings. LTE is used throughout this disclosure as an example cellular system, but the ideas presented herein may apply to other wireless communication systems as well.

Figure 6:
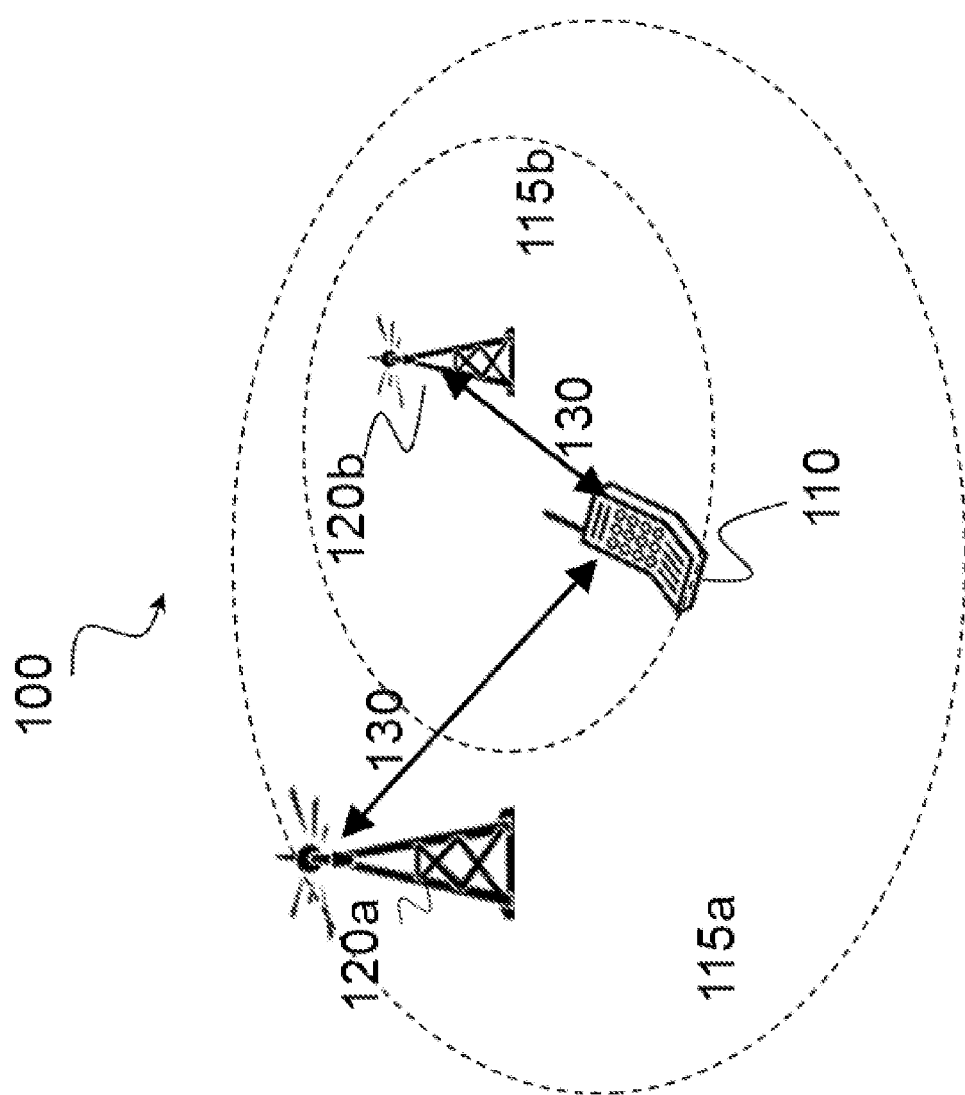
FIG. 6 is a block diagram illustrating an example wireless network, according to some embodiments.

FIG. 6 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Figure 2:
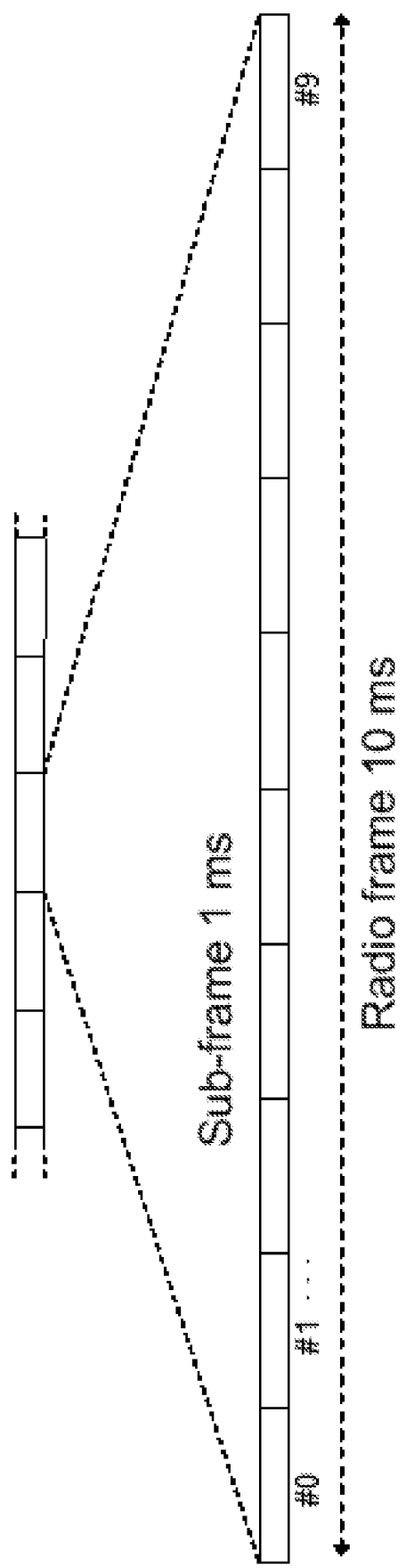
FIG. 2 illustrates an example radio frame.

Wireless signals 130 may include frames and subframes, such as those described with respect to FIGS. 1 and 2. Network node 120 may dynamically schedule subframes as an uplink subframe, a downlink subframe, or a combination uplink and downlink subframe.

Figure 3:
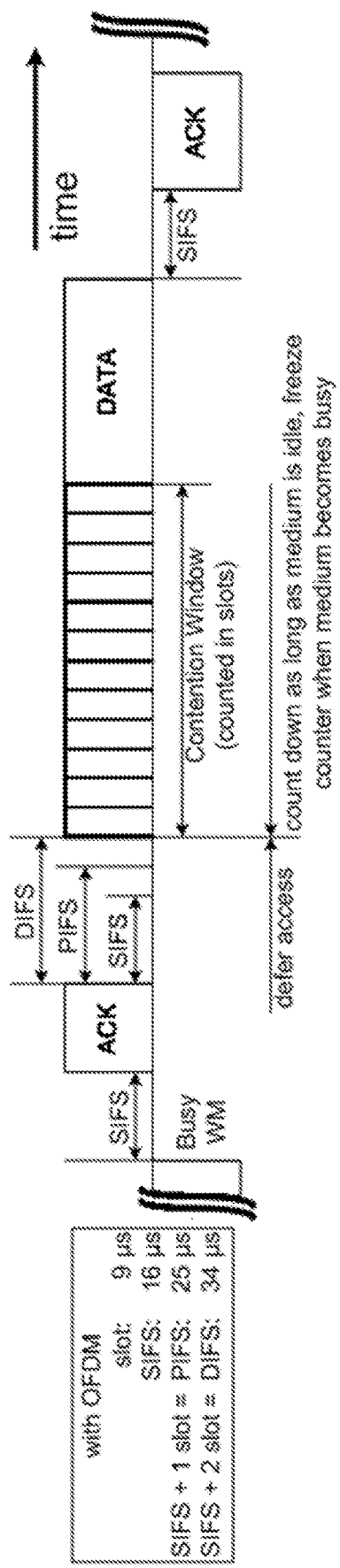
FIG. 3 illustrates an example WLAN listen-before-talk mechanism.
Figure 4:
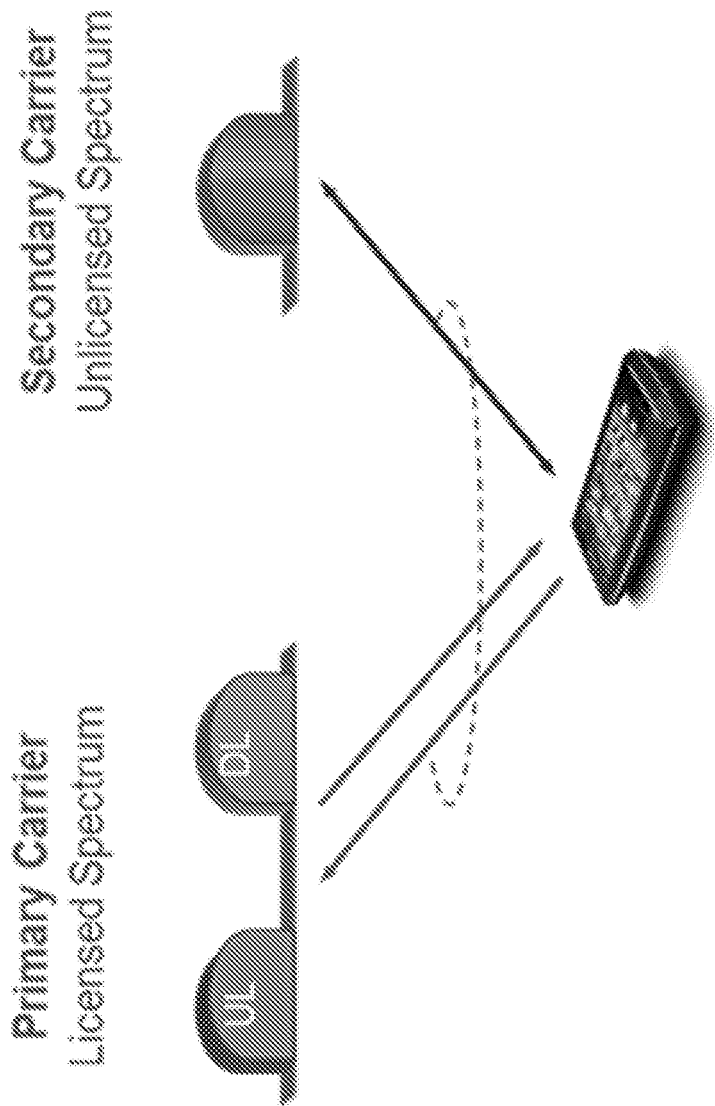
FIG. 4 illustrates a user equipment with license assisted access to unlicensed spectrum.
Figure 5:
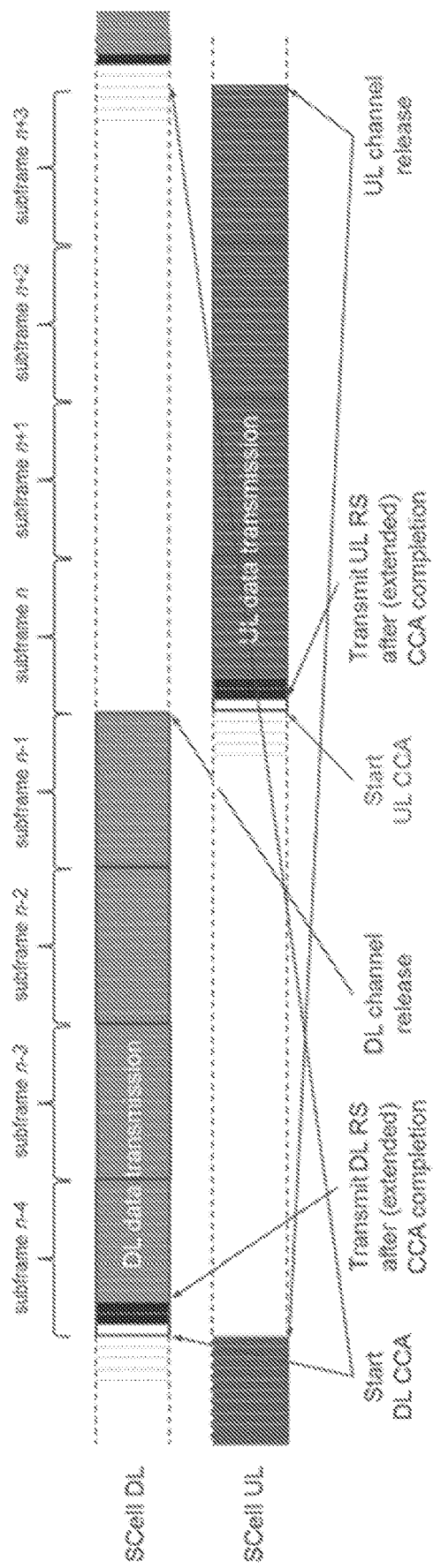
FIG. 5 illustrates an example of uplink license assisted access transmissions based on an uplink listen-before-talk protocol.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum. Particular LBT protocols are described above with respect to FIGS. 3-5.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, network node 120a may dynamically schedule uplink and downlink subframes for wireless device 110. For example, in particular embodiments network node 120a may determine a first uplink/downlink scheduling pattern for a first plurality of consecutive subframes. Network node 120a may transmit the first uplink/downlink scheduling pattern to wireless device 110 (e.g., using (E)PDCCH) and transmit at least one subframe to wireless device 110 according to the first uplink/downlink scheduling pattern.

If network node 120a received additional downlink data, or a request for uplink transmission from a wireless device, for example, then network node 120a may determine a second uplink/downlink scheduling pattern for a second plurality of consecutive subframes. Network node 120a may transmit the second uplink/downlink scheduling pattern to wireless device 110 in any of the subframes previously scheduled for wireless device 110.

In particular embodiments, the uplink/downlink scheduling pattern may comprise a number of subsequent downlink subframes, a number of subsequent downlink and uplink subframes, an indication of which subframes to monitor or not monitor for downlink, or any other suitable pattern.

In particular embodiments, wireless device 110 may receive, from network node 120 (e.g., using (E)PDCCH), a first uplink/downlink scheduling pattern for a first plurality of consecutive subframes. Wireless device 110 may receive at least one subframe according to the first uplink/downlink scheduling pattern. In one of the scheduled downlink subframes, wireless device 110 may receive a second uplink/downlink scheduling pattern for a second plurality of consecutive subframes.

Wireless device 110 may perform LBT procedures before transmitting in the uplink. In some embodiments, a wireless device 110 performs a first LBT procedure using a first contention window size and a first priority class for a first uplink transmission in unlicensed spectrum. The first uplink transmission comprises an acknowledged transmission, such as a PUSCH transmission. Wireless device 110 transmits a second uplink transmission in unlicensed spectrum. The second uplink transmission comprises an un-acknowledged transmission, such as an SRS transmission. Wireless device 110 receives an acknowledgement (e.g., HARQ ACK/NAK, NDI, etc.) for the first uplink transmission. Based on the acknowledgement, wireless device 110 may modify the first contention window size (e.g., increment contention window size for failed transmission, reset contention window size for successful transmission) for use with the next LBT procedure associated with the HARQ process used for the first transmission. Wireless device 110 may also modify a second contention window size based on the received acknowledgement for the first uplink transmission and the second priority class. For example, wireless device 110 may modify the contention window size for use with the next LBT procedure associated with the next SRS transmission based on the modification to the first contention window size (e.g., increment the second contention window size if the first contention window size was incremented, or reset the second contention window size if the first was reset).

In some embodiments, the increment size or initial reset value may differ based on the priority class associated with each contention window size. For example, wireless device 110 may increment the first contention size by a first amount based on the associated priority class. Wireless device 110 may also increment the second contention window size, but by a different amount than the first contentions window size. Wireless device 110 may increment the second contention window size by an amount according to the priority class associated with the second contention window size. If wireless device 110 resets the contention window sizes to an initial value, wireless device 110 may reset each contention window size to a different initial value determined by the priority class associated with each contention window. In some embodiments, wireless device 110 may simply use the value of the first contention window size for the value of the second contention window size, whether the two LBT procedures are associated with the same priority class or not.

Wireless device 110 performs a second LBT procedure using the second contention window size and the second priority class for a third uplink transmission in unlicensed spectrum. The third uplink transmission comprises an un-acknowledged transmission, such as an SRS transmission.

Although particular embodiments are described with respect to licensed or unlicensed spectrum, license assisted access, and/or carrier aggregation, the embodiments described herein apply equally to uplink and downlink scheduling in any spectrum and with respect to a single cell or any combination of cells.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 8A below. Similarly, a network node may include any suitable combination of hardware and/or software. For example, in particular embodiments, a network node, such as network node 120, may include the components described with respect to FIG. 9 below.

In general, particular embodiments include adjusting the contention window size for transmissions of non-acknowledged signals. The contention window size used for a Category 4 LBT operation of a non-acknowledged transmission is updated similarly to the contention window size of an acknowledged transmission received from the same node.

According to some embodiments, the indication for adjusting the contention window size of acknowledged transmissions based on Category 4 LBT from a network node can be used to adjust the contention window size of an un-acknowledged transmission based on Category 4 LBT from the same network node. The timing of the transmission occurrence of acknowledged and un-acknowledged transmission should be close enough so that the indication for the acknowledged transmission is relevant to the unacknowledged transmission.

As used herein, the term acknowledged transmission may also refer to an acknowledgeable transmission. For example, the term acknowledged transmission may refer to a transmission that has already been acknowledged, or may refer to a transmission that has or will be sent, and is a type of transmission for which an acknowledgement is expected (e.g., PUSCH), but has not yet been acknowledged. Similarly, an un-acknowledged transmission refers to a type of transmission for which an acknowledgement is not expected (e.g., SRS).

Particular examples are described using SRS transmission in the uplink. In uplink transmission on unlicensed spectrum, the PUSCH transmission is based on Category 4 LBT. A wireless device may assess the PUSCH transmission to determine whether the transmission was successful (e.g., HARQ feedback such as NDI). Based on the assessment, the corresponding contention window size can be adjusted (i.e., the window size may be incremented or reset to its minimum value).

A positive acknowledgement refers to an acknowledgement that indicates a successful transmission (e.g., an NDI value that indicates a new data transmission). A negative acknowledgement refers to an acknowledgement that indicates a failed transmission (e.g., an NDI value that indicates a retransmission).

In a particular embodiment, the Category 4 LBT procedures for the acknowledged (e.g., PUSCH) and the un-acknowledged (e.g., SRS-only) transmissions may be sent using the same priority class. The same contention window parameters may be used for the un-acknowledged transmission as for the acknowledged transmission. For example, the contention window parameters may be updated only for the acknowledged transmission, and when the unacknowledged transmission is sent, the wireless device uses the latest value of the contention window size to perform the Category 4 random backoff procedure.

In some embodiments, the acknowledged (e.g., PUSCH) and unacknowledged (e.g., SRS-only) transmissions use different priority classes. Considering that the same wireless device can be scheduled by the network node to transmit both PUSCH and SRS, when the SRS transmission is subject to Category 4 LBT, the channel conditions that affect whether the contention window size is going to be increased or reset prior to the Category 4 LBT attempt are most likely similar to the channel conditions for the PUSCH transmission. In other words, the indication for adjusting the contention window size for a PUSCH transmission by the UE can be used for adjusting the contention window size for an SRS-only transmission when the last transmission for both types occurred in very close temporal proximity to each other.

For example, the contention window for the SRS-only transmission is increased or reset according to what was done for the PUSCH if the occurrence of the SRS-only transmission and the PUSCH transmission that determined the increase or reset of the contention window size for PUSCH were X ms apart. X may be configurable in a system depending on traffic load and deployment conditions.

Particular embodiments may use a simple procedure for the update of LBT parameters for the unacknowledged transmission. This may be beneficial, for instance, where the interference conditions are unlikely to change over long periods of time, or where it may be desirable for the UEs to have minimal complexity. In these embodiments, the wireless device updates the contention window size for the unacknowledged transmission based on the latest PUSCH transmission transmitted following a Category 4 LBT procedure regardless of the proximity of the previous SRS-only transmission to the PUSCH transmission.

If the wireless device incremented the contention window size because of the PUSCH transmission, the wireless device also increments its corresponding contention window size for the SRS-only transmission. Similarly, if the previous PUSCH transmission based on Category 4 caused the minimum contention window size for performing the Category 4 LBT procedure to be reset, the contention window size used for performing Category 4 LBT for SRS-only transmission is also reset.

As a result of the foregoing embodiments, the indication for adjusting the contention window size of acknowledged transmissions based on Category 4 LBT from the same node can be used to adjust the contention window size of an un-acknowledged transmission based on Category 4 LBT from the same node. The embodiments and examples described above may be generalized by the examples described with respect to FIG. 7.

Figure 7:
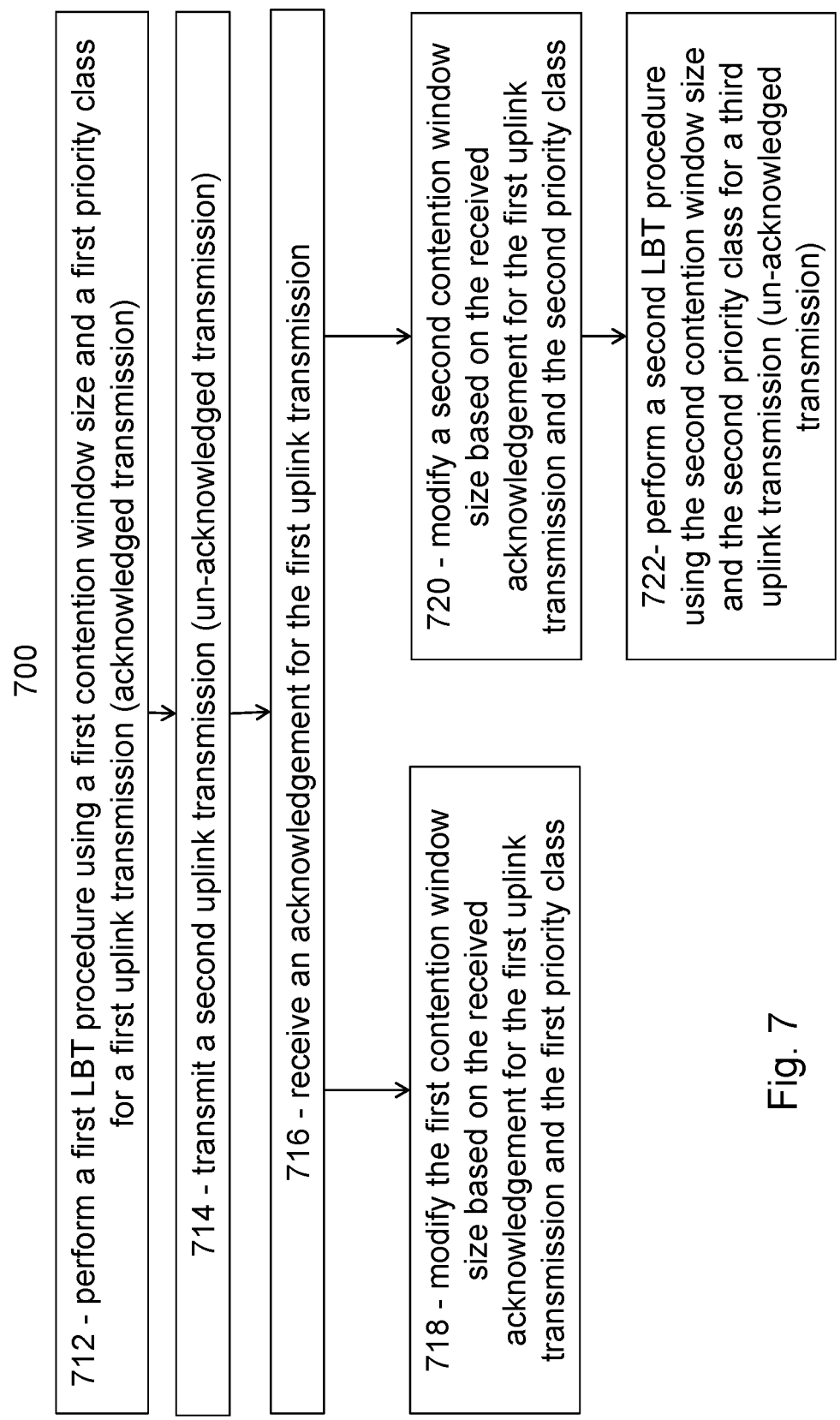
FIG. 7 is a flow diagram illustrating an example method in a user equipment, according to some embodiments.

FIG. 7 is a flow diagram illustrating an example method in a user equipment, according to some embodiments. The method manages a LBT contention window size for the user equipment. In particular embodiments, one or more steps of FIG. 7 may be performed by components of wireless network 100 described with respect to FIG. 6.

The method begins at step 712, where a UE performs a first LBT procedure using a first contention window size and a first priority class for a first uplink transmission in unlicensed spectrum. The first uplink transmission comprises an acknowledged transmission. For example, wireless device 110 may perform an LBT procedure for a scheduled PUSCH transmission.

In particular embodiments, the first uplink transmission comprises a most recent acknowledged uplink transmission transmitted after the first LBT procedure. In other embodiments, the first uplink transmission may comprise any acknowledged uplink transmission transmitted after the first LBT procedure.

At step 714, the UE transmits a second uplink transmission in unlicensed spectrum. The second uplink transmission comprises an un-acknowledged transmission. For example, wireless device 110 may transmit a SRS transmission.

In some embodiments, the second uplink transmission is transmitted within a predetermined time threshold of the first uplink transmission. For example, the first transmission may only be relevant to the second transmission if the two transmissions occur within a relatively short time period of each other. The value of the time threshold may vary based on particular network conditions (e.g., longer value under relatively static conditions, or shorter value for relatively dynamic conditions).

At step 716, the UE receives an acknowledgement for the first uplink transmission. For example, wireless device 110 may receive a HARQ acknowledgment and NDI for the first transmission. The acknowledgement indicates whether the network node, such as network node 120, received the transmission successfully.

At step 718, the UE modifies the first contention window size based on the received acknowledgement for the first uplink transmission and the first priority class. For example, wireless device 110 may increment (on failure) or reset (on success) the contention window size associated with the PUSCH transmission. The amount of the increment or the initial reset value may depend on the priority class associated with the first LBT procedure. Wireless device 110 may use the modified contention window size for an LBT procedure for a future PUSCH transmission.

In some embodiments, modifying the first contention window size may refer to calculating a modified contention window size, without updating a memory value for the first contention window size or performing an LBT procedure using the first contention window size. For example, modifying the first contention window size may refer to determining whether the first contention window size should be incremented or reset. The modification may be described by the particular operation (i.e., either increment or reset). Although the examples described herein refer to increment and reset operations, other backoff procedures may include other window size operations, such as a decrement operation.

At step 720, the UE modifies a second contention window size based on the received acknowledgement for the first uplink transmission and the second priority class. For example, the second contention window size may be associated with an LBT procedure for transmitting the next scheduled SRS transmission. Wireless device 110 may modify the second contention window size based on the acknowledgement for the PUSCH transmission received in step 716. Wireless device 110 may modify the second contention window size the same way it modified first contention window size in step 718 (e.g., if increment in step 718, then increment in step 720; if reset in step 718, then reset in step 720).

Although the operations performed on the first and second contention window size are the same (i.e., increment or reset), the resulting values may be different. For example, each contention window may be associated with a different priority class, thus the increment amount or reset value for each contention window may be different. Accordingly, modifying the second contention window size comprises incrementing the second contention window size according to the second priority class when the acknowledgement for the first uplink transmission is a negative acknowledgement and resetting the second contention window size according to the second priority class when the acknowledgement for the first uplink transmission is a positive acknowledgement.

In some embodiments, the second contention window size may simply be set to the same size as the first contention window size. The two contention windows may be associated with the same priority level, or the sizes may be set to the same value even if the two contention windows are associated with different priority levels.

In some embodiments, modifying the second contention window size may refer to using the first contention window size without the need to actually modify a second contention window size in memory. For example, modifying the second contention window size based on the first contention window size may refer to using the value of the first contention window size in place of the second contention window size.

At step 722, the UE performs a second LBT procedure using the second contention window size and the second priority class for a third uplink transmission in unlicensed spectrum. The third uplink transmission comprises an un-acknowledged transmission. For example, wireless device 110 may use the modified second contention window size to perform an LBT procedure for another SRS transmission. Even though the first SRS transmission was unacknowledged, wireless device 110 is able to optimize the contention window size for the next SRS transmission based on the acknowledgement for the PUSCH transmission.

Modifications, additions, or omissions may be made to method 700. Additionally, one or more steps in method 700 of FIG. 7 may be performed in parallel or in any suitable order. The steps of method 700 may be repeated over time as necessary.

Figure 8B:
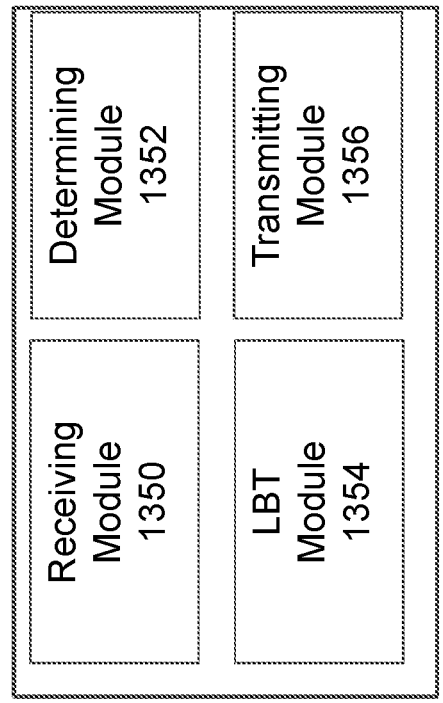
FIG. 8B is a block diagram illustrating example components of a wireless device.
Figure 8A:
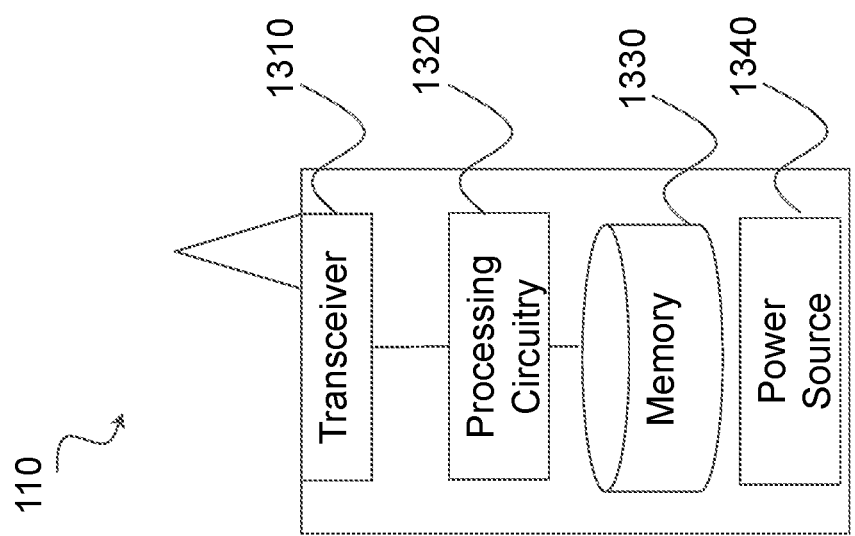
FIG. 8A is a block diagram illustrating an example embodiment of a wireless device.

FIG. 8A is a block diagram illustrating an example embodiment of a wireless device. The wireless device is an example of the wireless devices 110 illustrated in FIG. 6. In particular embodiments, the wireless device is capable of performing LBT procedures before transmitting in the uplink. The wireless device may adjust the contention window size associated with an LBT procedure for an unacknowledged transmission based on an acknowledged transmission.

For example, the wireless device performs a first LBT procedure using a first contention window size and a first priority class for a first uplink transmission in unlicensed spectrum. The first uplink transmission comprises an acknowledged transmission. The wireless device transmits a second uplink transmission in unlicensed spectrum. The second uplink transmission comprises an un-acknowledged transmission. The wireless device receives an acknowledgement for the first uplink transmission; modifies the first contention window size based on the received acknowledgement for the first uplink transmission and the first priority class; modifies a second contention window size based on the received acknowledgement for the first uplink transmission and the second priority class; and performs a second LBT procedure using the second contention window size and the second priority class for a third uplink transmission in unlicensed spectrum. The third uplink transmission comprises an un-acknowledged transmission.

In particular embodiments, wireless device modifies the second contention window size by incrementing the second contention window size according to the second priority class when the acknowledgement for the first uplink transmission is a negative acknowledgement and resetting the second contention window size according to the second priority class when the acknowledgement for the first uplink transmission is a positive acknowledgement. The first uplink transmission may comprise a most recent acknowledged uplink transmission transmitted after the first LBT procedure. The second uplink transmission may be transmitted within a predetermined time threshold of the first uplink transmission. The predetermined time threshold may be modified based on network conditions.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

In particular embodiments, processing circuitry 1320 in communication with transceiver 1310 performs LBT procedures before transmitting in the uplink, and may adjust the contention window size associated with an LBT procedure for an unacknowledged transmission based on an acknowledged transmission.

Other embodiments of the wireless device may include additional components (beyond those shown in FIG. 8A) responsible for providing certain aspects of the wireless device's functionality, including any of the functionality described above and/or any additional functionality (including any functionality necessary to support the solution described above).

FIG. 8B is a block diagram illustrating example components of a wireless device 110. The components may include receiving module 1350, determining module 1352, LBT module 1354, and transmitting module 1356.

Receiving module 1350 may perform the receiving functions of wireless device 110. For example, receiving module 1350 may receive uplink scheduling from a network node. The uplink scheduling may include acknowledgements of previous uplink transmissions. Receiving module 1350 may perform the receiving functions described in any of the examples above. In certain embodiments, receiving module 1350 may include or be included in processing circuitry 1320. In particular embodiments, receiving module 1350 may communicate with determining module 1352, LBT module 1354, and transmitting module 1356.

Determining module 1352 may perform the determining functions of wireless device 110. For example, determining module 1352 may modify a first contention window size based on a received acknowledgement for a first uplink transmission and a first priority class, and modify a second contention window size based on the received acknowledgement for the first uplink transmission and a second priority class, as described in any of the examples above. In certain embodiments, determining module 1352 may include or be included in processing circuitry 1320. In particular embodiments, determining module 1352 may communicate with receiving module 1350, LBT module 1354, and transmitting module 1356.

LBT module 1354 may perform the listen-before-talk functions of wireless device 110. For example, LBT module 1354 may perform an LBT procedure with random backoff or perform a fixed duration clear channel assessment. LBT module 1354 may increment or reset a contention window size for performing LBT. In certain embodiments, LBT module 1354 may include or be included in processing circuitry 1320. In particular embodiments, LBT module 1354 may communicate with receiving module 1350, determining module 1352, and transmitting module 1356.

Transmitting module 1356 may perform the transmitting functions of wireless device 110. For example, transmitting module 1356 may transmit uplink subframes to network node 120. In certain embodiments, transmitting module 1356 may include or be included in processing circuitry 1320. In particular embodiments, transmitting module 1356 may communicate with receiving module 1350, determining module 1352 and LBT module 1354.

Figure 9:
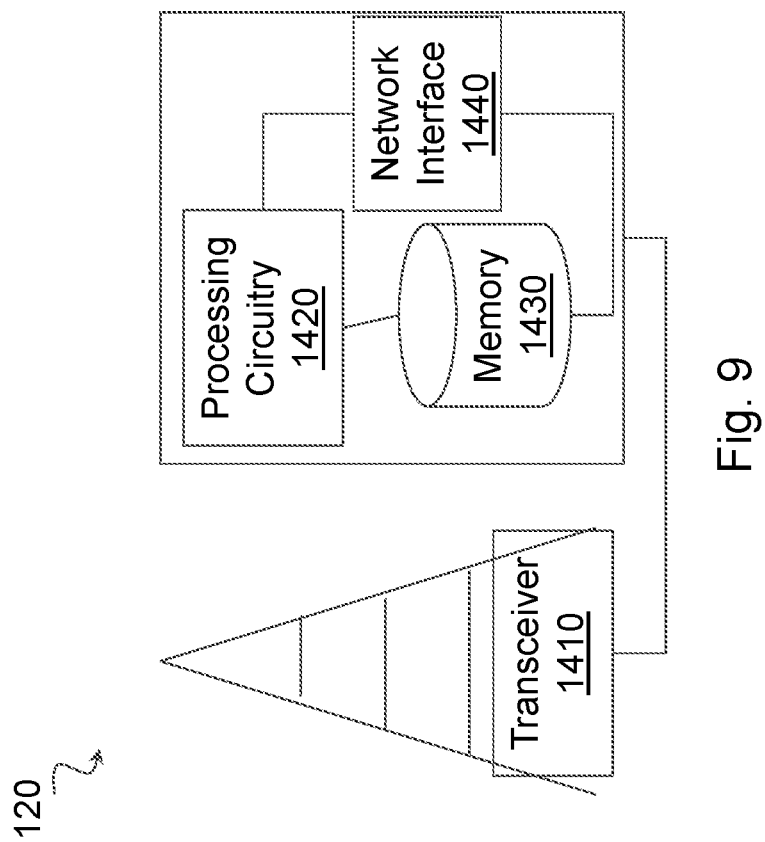
FIG. 9 is a block diagram illustrating an example embodiment of a network node.

FIG. 9 is a block diagram illustrating an example embodiment of a network node. The network node is an example of the network node 120 illustrated in FIG. 6. In particular embodiments, the network node is capable of scheduling a wireless device for wireless transmission and acknowledging the success of failure of uplink transmissions from the wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 8A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

Other embodiments of network node 120 include additional components (beyond those shown in FIG. 9) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations Used in the Preceding Description Include:
3GPP Third Generation Partnership Project
ACK Acknowledgement
BTS Base Transceiver Station
CCA Clear Channel Assessment
CW Contention Window
D2D Device to Device
DCF Distributed Coordination Function
DIFS DCF Inter-Frame Spacing
DL Downlink
DMRS Demodulation Reference Signal
DwPTS Downlink Pilot Time Slot
eNB eNodeB
FDD Frequency Division Duplex
HARQ Hybrid Automatic Repeat Request
LAA License Assisted Access
LBT Listen-Before-Talk
LTE Long Term Evolution
LTE-U LTE in Unlicensed Spectrum
MAC Medium Access Control
M2M Machine to Machine
MIMO Multi-Input Multi-Output
MRBC Multiple Random Backoff Channels
MTC Machine Type Communication
NAK Negative Acknowledgement
NR New Radio
PDSCH Physical Downlink Shared Channel
PIFS PCF Inter-Frame Spacing
PUCCH Physical Uplink Control Channel
QCI QoS Class Indicator
QoS Quality of Service
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
RS Reference Signal
SCell Secondary Cell
SRBC Single Random Backoff Channel
SRS Sounding Reference Signal
SIFS Short Inter-Frame Spacing
TDD Time Division Duplex
UE User Equipment
UL Uplink
UTRAN Universal Terrestrial Radio Access Network
WAN Wireless Access Network

The invention claimed is:

1. A method for use in a user equipment (UE) of managing a listen-before-talk (LBT) contention window size, the method comprising:
performing a first LBT procedure using a first contention window size and a first priority class for a first uplink transmission in unlicensed spectrum, the first uplink transmission being an acknowledged transmission or an acknowledgeable transmission;
transmitting a second uplink transmission in unlicensed spectrum, the second uplink transmission being an unacknowledgeable transmission;
receiving an acknowledgement for the first uplink transmission;
modifying the first contention window size based on the received acknowledgement for the first uplink transmission and the first priority class;
modifying a second contention window size based on the received acknowledgement for the first uplink transmission and a second priority class, wherein the second priority class is associated with a second LBT procedure for the second uplink transmission; and
performing a third LBT procedure using the second contention window size and the second priority class for a third uplink transmission in unlicensed spectrum, the third uplink transmission being an unacknowledgeable transmission.

2. The method of claim 1, wherein modifying the second contention window size comprises incrementing the second contention window size according to the second priority class when the acknowledgement for the first uplink transmission is a negative acknowledgement and resetting the second contention window size according to the second priority class when the acknowledgement for the first uplink transmission is a positive acknowledgement.

3. The method of claim 1, wherein the first uplink transmission comprises a most recent acknowledged uplink transmission transmitted after the first LBT procedure.

4. The method of claim 1, wherein the second uplink transmission is transmitted within a predetermined time threshold of the first uplink transmission.

5. The method of claim 4, further comprising modifying the predetermined time threshold based on network conditions.

6. The method of claim 1, wherein modifying the second contention window size comprises setting the second contention window size equal to the modified first contention window size.

7. The method of claim 6, wherein the first priority class is equal to the second priority class.

8. The method of claim 1, wherein the first uplink transmission comprises a physical uplink shared channel (PUSCH) transmission.

9. The method of claim 1, wherein the second uplink transmission and the third uplink transmission comprise a sounding reference signal (SRS) transmission.

10. A user equipment (UE) capable of managing a listen-before-talk (LBT) contention window size, the UE comprising processing circuitry operable to:
   perform a first LBT procedure using a first contention window size and a first priority class for a first uplink transmission in unlicensed spectrum, the first uplink transmission being an acknowledged transmission or an acknowledgeable transmission;
   transmit a second uplink transmission in unlicensed spectrum, the second uplink transmission being an unacknowledgeable transmission;
   receive an acknowledgement for the first uplink transmission;
   modify the first contention window size based on the received acknowledgement for the first uplink transmission and the first priority class;
   modify a second contention window size based on the received acknowledgement for the first uplink transmission and a second priority class, wherein the second priority class is associated with a second LBT procedure for the second uplink transmission; and
   perform a third LBT procedure using the second contention window size and the second priority class for a third uplink transmission in unlicensed spectrum, the third uplink transmission being an unacknowledgeable transmission.

11. The UE of claim 10, wherein the processing circuitry modifies the second contention window size by incrementing the second contention window size according to the second priority class when the acknowledgement for the first uplink transmission is a negative acknowledgement and resetting the second contention window size according to the second priority class when the acknowledgement for the first uplink transmission is a positive acknowledgement.

12. The UE of claim 10, wherein the first uplink transmission comprises a most recent acknowledged uplink transmission transmitted after the first LBT procedure.

13. The UE of claim 10, wherein the second uplink transmission is transmitted within a predetermined time threshold of the first uplink transmission.

14. The UE of claim 13, further the processing circuitry further operable to modify the predetermined time threshold based on network conditions.

15. The UE of claim 10, wherein the processing circuitry modifies the second contention window size by setting the second contention window size equal to the modified first contention window size.

16. The UE of claim 15, wherein the first priority class is equal to the second priority class.

17. The UE of claim 10, wherein the first uplink transmission comprises a physical uplink shared channel (PUSCH) transmission.

18. The UE of claim 10, wherein the second uplink transmission and the third uplink transmission comprise a sounding reference signal (SRS) transmission.

* * * * *